US010342022B2

(12) United States Patent
Toskala et al.

(10) Patent No.: US 10,342,022 B2
(45) Date of Patent: Jul. 2, 2019

(54) IMPROVING COMMUNICATION EFFICIENCY

(71) Applicant: Nokia Solutions and Networks Oy, Espoo (FI)

(72) Inventors: Antti Anton Toskala, Espoo (FI); Sari Nielsen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 115 days.

(21) Appl. No.: 15/525,358

(22) PCT Filed: Nov. 24, 2014

(86) PCT No.: PCT/EP2014/075392
§ 371 (c)(1),
(2) Date: May 9, 2017

(87) PCT Pub. No.: WO2016/082856
PCT Pub. Date: Jun. 2, 2016

(65) Prior Publication Data
US 2017/0325241 A1  Nov. 9, 2017

(51) Int. Cl.
*H04W 72/08* (2009.01)
*H04W 24/10* (2009.01)

(52) U.S. Cl.
CPC ......... *H04W 72/082* (2013.01); *H04W 24/10* (2013.01)

(58) Field of Classification Search
None
See application file for complete search history.

(56) References Cited

U.S. PATENT DOCUMENTS

| 6,747,969 B1 | 6/2004 | Hirsch .................... 370/342 |
| 2008/0189970 A1 | 8/2008 | Wang et al. ............... 33/701 |
| 2009/0253448 A1* | 10/2009 | Kwon ............... H04W 24/02 455/501 |
| 2010/0220626 A1* | 9/2010 | Das ................... H04W 72/1284 370/252 |
| 2010/0323711 A1 | 12/2010 | Damnjanovic et al. ..... 455/450 |
| 2013/0150106 A1* | 6/2013 | Bucknell .............. H04W 16/14 455/501 |
| 2013/0208587 A1* | 8/2013 | Bala ..................... H04W 16/14 370/230 |

(Continued)

FOREIGN PATENT DOCUMENTS

WO   WO 2013/068832 A1   5/2013

*Primary Examiner* — Candal Elpenord
(74) *Attorney, Agent, or Firm* — Harrington & Smith (57) ABSTRACT

There is provided a method including generating, by a network element, at least one transmission gap within data transmission performed by the network element, transmitting a control message to at least one terminal device, wherein the control message includes a first request to perform, by the at least one terminal device, a first interference measurement during the at least one transmission gap, and wherein the control message further includes a second request to perform, by the at least one terminal device, a second interference measurement during the said data transmission, receiving, from the at least one terminal device, an interference report including information that is at least partly based on the first and the second interference measurements, and providing communication resources on the basis of the received interference report.

19 Claims, 6 Drawing Sheets

(56) References Cited

U.S. PATENT DOCUMENTS

| | | | |
|---|---|---|---|
| 2013/0281143 A1* | 10/2013 | Nentwig | H04W 72/1231 |
| | | | 455/501 |
| 2013/0322279 A1* | 12/2013 | Chincholi | H04W 24/10 |
| | | | 370/252 |
| 2014/0044095 A1 | 2/2014 | Li et al. | 370/331 |
| 2014/0206341 A1* | 7/2014 | Siomina | H04W 36/0085 |
| | | | 455/422.1 |
| 2014/0269313 A1* | 9/2014 | Liu | H04W 24/02 |
| | | | 370/235 |
| 2014/0302865 A1 | 10/2014 | Bai et al. | 455/452.1 |
| 2015/0029907 A1* | 1/2015 | Cucala Garcia | H04L 5/0073 |
| | | | 370/278 |
| 2015/0245234 A1* | 8/2015 | Roy | H04W 16/14 |
| | | | 370/252 |
| 2016/0037525 A1* | 2/2016 | Malmirchegini | H04W 24/02 |
| | | | 370/329 |

* cited by examiner

Fig. 1

210 GENERATING, BY A NETWORK ELEMENT, AT LEAST ONE TRANSMISSION GAP WITHIN DATA TRANSMISSION PERFORMED BY THE NETWORK ELEMENT

220 TRANSMITTING A CONTROL MESSAGE AT LEAST ONE TERMINAL DEVICE REQUESTING THE AT LEAST ONE TERMINAL DEVICE TO PERFORM A FIRST INTERFERENCE MEASUREMENT DURING THE AT LEAST ONE TRANSMISSION GAP AND A SECOND INTERFERENCE MEASUREMENT DURING THE DATA TRANSMISSION

230 RECEIVING, FROM THE AT LEAST ONE TERMINAL DEVICE, AN INTERFERENCE REPORT COMPRISING INFORMATION THAT IS AT LEAST PARTLY BASED ON THE FIRST AND THE SECOND INTERFERENCE MEASUREMENTS

240 PROVIDING COMMUNICATION RESOURCES ON THE BASIS OF THE RECEIVED INTERFERENCE REPORT

IMPROVING COMMUNICATION EFFICIENCY

TECHNICAL FIELD

The invention relates to communications.

BACKGROUND

The demand for more efficient networks has risen in the recent years as applications and services have become more and more data demanding. At the same time the complexity of networks has also increased. Therefore, controlling the network's ability to manage the increased data demand and complexity has become a popular topic, and finding solutions for increased control may be beneficial for the capability of the network.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these protocols.

Figure 1:
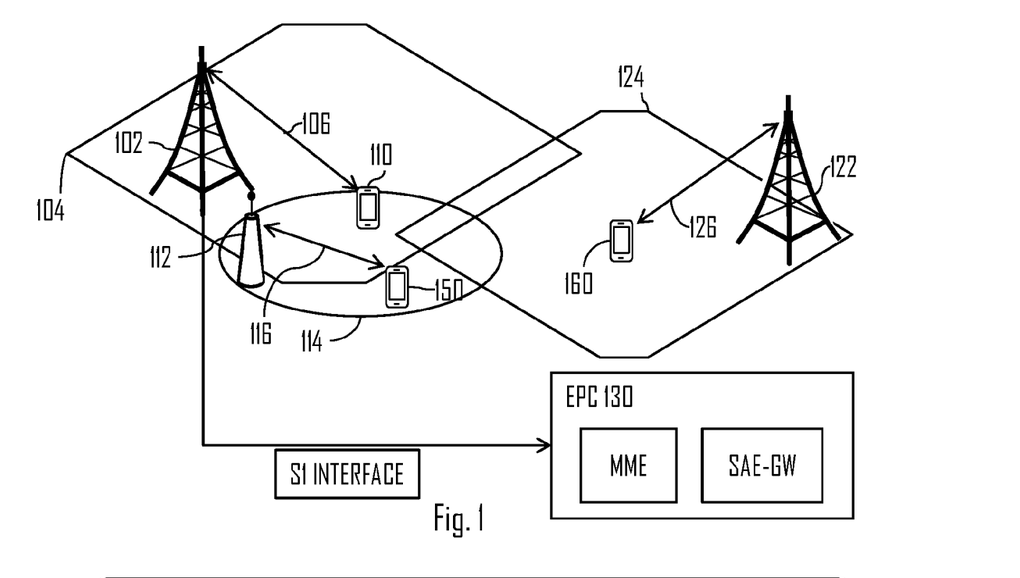
FIG. 1 illustrates a wireless communication scenario to which embodiments of the invention may be applied.

FIG. 1 illustrates a wireless communication scenario to which embodiments of the invention may be applied. Radio communication networks, such as the Long Term Evolution (LTE) or the LTE-Advanced (LTE-A) of the $3^{rd}$ Generation Partnership Project (3GPP), are typically composed of at least one network element, such as network element 102, providing a cell 104. The network element 102 may be part of a radio communication network operated by an operator. Each cell may be, e.g., a macro cell, a micro cell, or a pico-cell, for example. The network element 102 may be an evolved node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. The network element 102 may be a base station or a small base station, for example. In the case of multiple eNBs in the communication network, the eNBs may be connected to each other with an X2 interface as specified in the LTE. Other communication methods between the network elements may be possible.

The network element 102 may be further connected via an S1 interface to an evolved packet core (EPC) 130, more specifically to a mobility management entity (MME) and to a system architecture evolution gateway (SAE-GW). The network element 102 may control a cellular radio communication link 106 established between the network element 102 and at least one terminal device 110 located within or comprised in the cell 104. The communication link 106 may be referred to as conventional communication link for end-to-end communication, where the source device transmits data to the destination device via the network element 102 and/or core network.

The at least one terminal device 110 may be within multiple cells provided by one or more network elements in the radio communication network. The serving network element may be selected by various criteria, such as received power, signal to noise ratio (SNR) and path loss, to name a few. The at least one terminal device 110 may be a terminal device of a cellular communication system, e.g. a computer (PC), a laptop, a palm computer, a mobile phone, a tablet, a phablet or any other user terminal or user equipment capable of communicating with the cellular communication network. In an embodiment, the at least one terminal device 110 is able to communicate with other similar devices via the network element 102. The other devices may be within the cell 104 and/or may be within other cells provided by other network elements. The at least one terminal device 110 may be stationary or on the move. The at least one terminal device 110 may also support Device-to-Device (D2D) communication enabling the at least one terminal device 110 to directly communicate with other terminal devices.

Typically the network may use licensed bands for communication. However, at times there may be a need to apply more resources. This may be accomplished by performing communications on unlicensed bands, such as LTE-Unlicensed (LTE-U) and/or Licensed Assisted Access (LAA). An example frequency band for such unlicensed LTE-operation may be the 5 GHz industrial, scientific and medical (ISM) band. Although the licensed band LTE may have better service quality than the unlicensed spectrum and the LTE-U may not remove the need to have more licensed band, the LTE-U may be advantageous to meet the user demands in some situations.

In FIG. 1, the illustrated wireless communication scenario may further comprise a small network element 112 providing a small cell 114. The small network element may be, for example, an access node and/or a base station of a wireless local area network (WLAN) or a small base station. The small cell 114 may be a femto, a pico and/or a micro cell, for example. The small network element 112 may be comprised in a second radio communication network operated by a second operator. The small cell 114 may be at least partially within the cell 104. In an embodiment, the small cell 114 is fully within the cell 104. In an embodiment, the small cell 114 is outside the cell 104.

The wireless communication scenario may comprise a second network element 122 providing a second cell 124. The second network element 122 may be comprised in the second communication network or in a third communication network operated by a third operator and/or the second operator. The second cell 124 and the cell 104 may at least partially cover the same areas. Thus, the at least one terminal device 110 may be within both cells 104, 124.

The small network element 112 and the second network element 122 may provide communication links 116, 126 to terminal devices 150, 160 respectfully, wherein the second terminal device 150 may be within the small cell 114 and the third terminal device 160 may be within the second cell 124, as shown in FIG. 1. In an embodiment, the second terminal device 150 is within the cell 104. Similarly, the third terminal device 160 may within the cell 104.

As the different radio communication networks may be operated by different operators, the network elements 102, 112, 122 may be unaware of each other. Such a scenario may possible, for example, if at least some of the network elements are operating on an unlicensed band, such as the LTE-U described above. The communication links 106, 116, 126 may be managed independently, and thus the transmission and/or receiving of data, by the network element 102, 112, 122 and/or the terminal devices 110, 150, 160, may cause interference to each other and to other network nodes as well. Moreover, if the interference is tried to be avoided too much, the capacity of the network may decrease.

There is provided a solution for enhancing interference measurement in a radio communication network. It may be beneficial for the network performance to acquire additional information, by the network element 102, about interference to the at least one terminal device 110 caused by other networks, and to be more precise, other network elements in the other networks, and to use this information to manage network resources. Furthermore, the interference measurement may enable the LTE-U networks to more effectively operate on areas where there are WLAN access node(s) present, and to enhance co-existence of the network element 102 and the WLAN access nodes(s). This may be necessary, for example, if the WLAN access node(s) and the LTE-U utilizing network element 102 are using the same frequency band.

Furthermore, the present solution may be applicable for shared spectrums, which may be either moderately licensed and/or licensed for more than one license holders, wherein some may have primary license and others secondary license (s). In such case the different operators may be unaware of each other's network elements.

Figure 2:
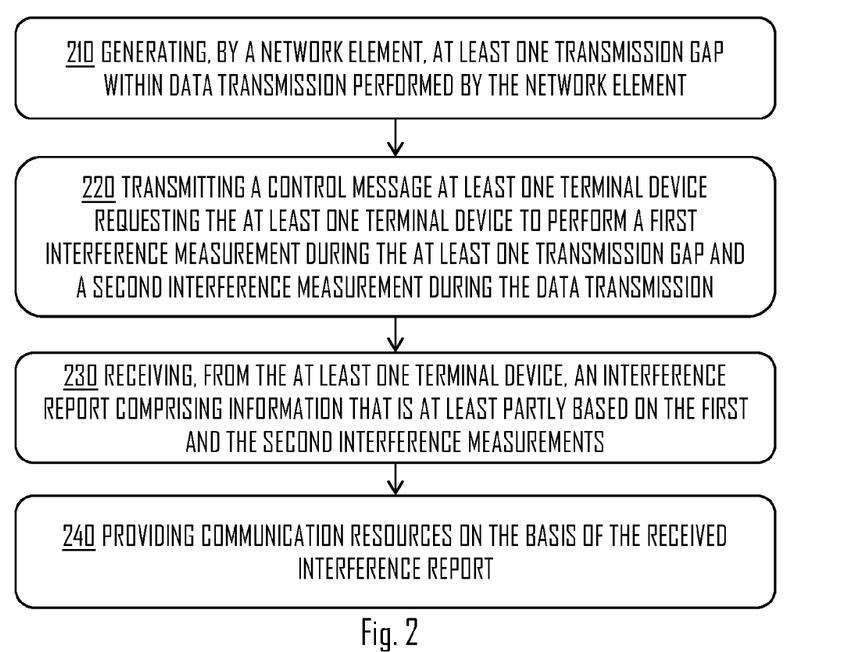
FIG. 2 illustrates a flow diagram according to an embodiment of the invention.

FIG. 2 illustrates a flow diagram according to an embodiment of the invention. Referring to FIG. 2, in step 210, the network element 102 may generate at least one transmission gap within data transmission performed by the network element 102. The at least one transmission gap may be thus generated within a planned data transmission of the network element 102. The data transmission may be, for example, downlink data transmission to the at least one terminal device 110 and/or to another network element. The at least one transmission gap may mean that the network element 102 is not sending any data during the at least one transmission gap and/or it may mean that the network element 102 reduces the power of the data transmission during the at least one transmission gap. It may be also possible that the network element 102 directs the data transmission during the at least one data transmission gap so that it directed away from the at least one terminal device 110. Thus, data may be transmitted during the at least one transmission gap, but it may not have an interfering effect to the at least one terminal device 110. This may be achieved by using a beam antenna, for example.

In step 220, the network element 102 may transmit a control message to the at least one terminal device 110, wherein the control message comprises a first request to perform, by the at least one terminal device 110, a first interference measurement during the at least one transmission gap, and wherein the control message further comprises a second request to perform, by the at least one terminal device 110, a second interference measurement during the said data transmission of the network element 102. Therefore, the at least one terminal device 110 may be requested to perform the second interference measurement when the network element 102 is transmitting data, and to perform the first interference measurement when the network element 102 is taking a break in data transmission and/or is managing the data transmission so that it may not cause interference to the at least one terminal device 110.

In step 230, the network element 102 may receive, from the at least one terminal device 110, an interference report comprising information that is at least partly based on the first and the second interference measurements performed by the at least one terminal device 110. This may mean that the interference report comprises information about the interference measured and/or experienced by the at least one terminal device 110. The actual contents of the interference report may vary, as discussed later.

In step 240, the network element 102 may provide communication resources on the basis of the received interference report. For example, if network element 102 determines, based on the interference report, that there is another network element on the area causing interference to the at least one terminal device 110, the network element 102 may reduce the transmission time of its own data transmission in order to allow better co-existence between the network element 102 and the other network element. Furthermore, if the interference report suggests that interference is moderate and/or non-existing, the network element 102 may increase its own data transmission time, and thus enhance the network performance.

Figure 3:
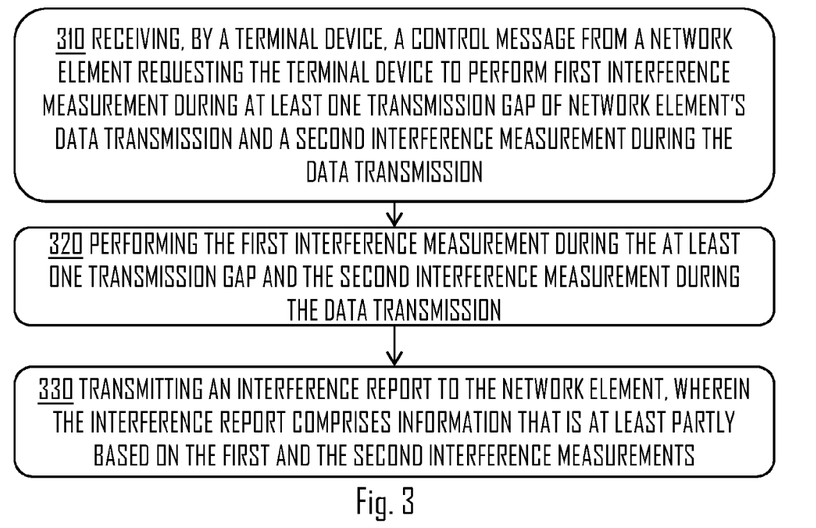
FIG. 3 illustrates a flow diagram according to an embodiment of the invention.

FIG. 3 illustrates a flow diagram according to an embodiment of the invention. Referring to FIG. 3, in step 310, a terminal device, such as the at least one terminal device 110 of FIG. 1, may receive a control message from the network element 102, wherein the control message comprises a first request to perform a first interference measurement during at least one transmission gap of data transmission performed by the network element 102, and wherein the control message further comprises a second request to perform a second interference measurement during the said data transmission. The first and second request may request the interference measurements to be performed in a specific system time. This may that, for example, in a frame based system the interference measurements may be requested to be performed at a certain radio sub-frame and/or a slot. On the other hand, the requests may allow the terminal device to perform the measurements in a certain time intervals. This may mean that, for example, if one transmission gap lasts for two consecutive sub-frames, the first measurement may be requested to be performed during the said two sub-frames, and the terminal device may selectively perform the first measurement on one of the said two sub-frames.

In step 320, the terminal device may perform the first and the second interference measurements, wherein the first interference measurement is performed during the at least one transmission gap, and wherein the second interference measurement is performed during the data transmission of the network element 102. In step 330, the terminal device may further transmit an interference report to the network element 102, wherein the interference report comprises information that is at least partly based on the first and the second interference measurements performed by the terminal device.

In an embodiment, the information in the interference report, transmitted by the network element 102 and received by the at least one terminal device 110, comprises result of the first interference measurement, result of the second interference measurement and/or an interference indicator indicating whether the measured interference, by the at least one terminal device 110, is over a first interference threshold or under a second interference threshold. Thus, the interference report may indicate directly that the interference is over the first interference threshold and/or under the second interference threshold. In an embodiment, the first and the second interference threshold values are the same. Naturally, if the interference report comprises the result(s) of the first and the second interference measurement(s), the network element 102 may determine, based on the result(s), whether the interference is over the first interference threshold or under the second interference threshold.

The first interference measurement may reveal if the interference is overt the first interference threshold or below the second interference threshold. The second interference measurement may be used as a reference that may affect the first and the second interference threshold values by changing the actual thresholds in order to enhance the overall interference measurement.

In an embodiment, the interference indicator comprises a first indication indicating that the ratio between the results of the first and the second interference measurements is over or under a first value, a second indication that the difference between the results of the first and the second interference measurements is over or under a second value and/or a third indication that the result of the first interference measurement is over or under a third value. Thus, the indication that the interference measured by the at least one terminal device 110 is over the first interference threshold may be indicated in different ways. For example, the first indication may indicate that the ratio between the results of the first and the second interference measurements is over the first value. When the network element 102 receives this indication, it may determine that the interference measured by the at least one terminal device is over the first interference threshold.

Similarly, the second indication may indicate that the difference between the results of the first and the second interference measurements is under the second value. When the network element 102 receives this indication, it may determine that the interference measured by the at least one terminal device is under the second interference threshold.

In an embodiment, the control message comprises the first and/or the second interference threshold values. Thus, the at least one terminal device 110 may generate the interference indicator as it may be aware of the first and the second thresholds. The said threshold values may be obtained, by the at least one terminal device 110, by other means also, such as pre-configuration and/or receiving them from another network node, for example.

Figure 4:
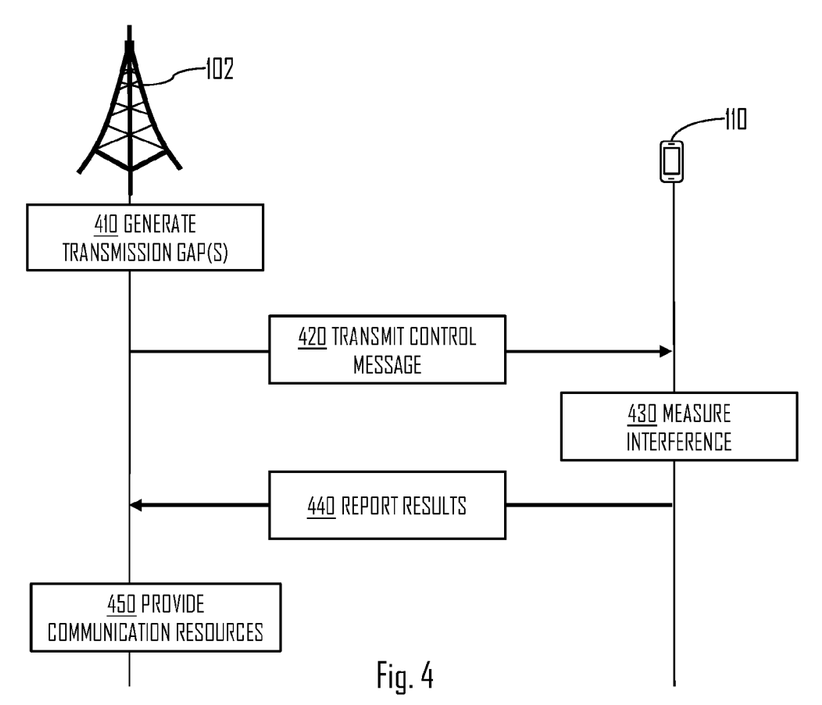
FIG. 4 illustrates a signal diagram according to an embodiment of the invention.

FIG. 4 illustrates a signal diagram according to an embodiment of the invention. Referring to FIG. 4, the network element 102 and/or the at least one terminal device 110 may operate on an unlicensed band of a radio system, such as the LTE-U. Before being permitted to transmit on a given unlicensed radio band, the at least one terminal device 110 and/or the network element 102 (such as an evolved node B (eNB) of the LTE-A) may, depending on the regulatory requirements, need to monitor the given radio frequency for a short period of time to ensure the spectrum is not already occupied by some other transmission. This requirement is referred to as Listen-Before-Talk (LBT)-procedure The total time during which the at least one terminal device 110 and/or the network element 102 may have transmissions on a given channel without reevaluating the availability of that channel, may be defined as a channel occupancy time. The channel occupancy time may be in the range 1 millisecond (ms) to 10 ms and the minimum idle period may be at least 5% of the channel occupancy time used by the at least one terminal device 110 and/or the network element 102 for the current fixed frame period. Depending on the regulatory requirements, channel occupancy times outside the given range, as the said range from 1 ms to 10 ms, may also be considered.

Still referring to FIG. 4, the network element 102 may generate the at least one transmission gap (block 410) as in step 210 of FIG. 2. The at least one transmission gap may be generated as a part of the LBT-procedure. Thus, the presented solution may enhance the effectiveness of the LBT-procedure when operating on an unlicensed band, as the regulatory time may be used to provide measurement results which in turn may be used to provide communication resources. Furthermore, no additional transmission gap(s) may be required, and therefore radio resources may be used more effectively.

The generated at least one transmission gap may be communicated to other network element(s) within the same network in order to further enhance the interference measurement results of the at least one terminal device 110. Thus, aligned transmission gaps between network elements may be generated, by the network element 102, and thus the interference measurements may be more effective.

In an embodiment, the network element 102 sends a request to the other network element(s), wherein the request causes the other network element(s) to provide generate the at least one transmission gap in their data transmission(s).

In block 420, the at least one transmission gap may be informed to the at least one terminal device 110 by the network element 102. As in step 220 of FIG. 2, the network element 102 may request the at least one terminal device 110 to perform the first and second interference measurements with the control message. The control message and/or the at least one transmission gap may be transmitted to the at least one terminal device 110 by using Radio Resource Control (RRC) signaling, for example.

In an embodiment, the control message and/or the at least one transmission gap is informed to the at least one terminal device 110 using Primary Cell (PCell) and/or Secondary Cell (SCell) signaling.

In step 430, the at least one terminal device 110 may perform the first and second interference measurements as in step 320 of FIG. 3. The performing may be based on the control message received from the network element 102. In an embodiment, the at least one terminal device 110 is configured to perform the first and the second interference measurements when it receives information about the at least one transmission gap from the network element 102. The first and second interference measurements may be performed to find out is there other transmissions on the same frequency channel, and how powerful the transmissions are.

The first and the second interference measurements may comprise measuring Received Signal Strength Indicator (RSSI) value by the at least one terminal device 110. As described, the first interference measurement may comprise measuring RSSI value during a time of the at least one transmission gap, and the second interference measurement may comprise measuring RSSI value during known data transmission (active sub-frame) of the network element 102. It may also be possible to use other measurements, such as Reference Symbol Received Power (RSRP), Reference Symbol Received Quality (RSRQ) and/or specific discovery signals. The discovery signals may be used to, for example, determine the identity of network elements causing interference to the at least one terminal device 110.

The at least one terminal device 110 may utilize synchronization signals, such as PSS (Primary Synchronization Signal), SSS (Secondary Synchronization signal) and/or discovery signals for defining that the interference causing radio access technology is LTE-U. Moreover, by using the said methods the actual identity of the LTE-U interference sources may be discovered in terms of PCI (Physical Layer Identify). Identity for LTE-U interference causing network elements may also be indicated in terms of Global Cell Identity (CID) and/or Public Land Mobile Network Identifier (PLMN ID). If the radio technology used by the interference source is WLAN, it may be detected by using a preamble and/or WLAN Service Set Identifier (SSID). Therefore, both LTE-U and/or WLAN network elements may be detected and moreover, identified.

In an embodiment, the RSSI measurement reveals interference power level regardless of the interference source. Thus, the RSSI measurement may only show the power level without the source of the interference.

In block 440, the at least one terminal device 110 may report, to the network element 102, the results of the interference measurements and/or the interference indicator indicating that the interference measured by the at least one terminal device 110 is over the first interference threshold or under the second interference threshold. The interference report may further comprise an indication indicating the radio technology used by at least one interference source that is causing interference to the at least one terminal device 110 during the at least one transmission gap. This may further enhance the network element 102 communication resource allocation. For example, if the at least one interference source comprises the network element 122 and/or similar network elements, the network element 102 may not need to reduce its transmission time as the network element 102, 112 may be using the same radio technology and/or be operating on the same LTE-U band. However, if the at least one interference source comprises the small network element 112, the transmission time of the network element 102 may be reduced as the radio technology used may be different and less capable of handling interference from other network elements. For example, at least one terminal device 110 may report in block 440 in addition to interference level also indication of possible detected WLAN preamble and/or WLAN SSID and possible power level for the detected WLAN signal. Power level could for instance be provided for the strongest detected WLAN preamble and/or SSID.

In an embodiment, the network element 102 requests the at least one terminal device 110 to report the radio technology used by at least one interference source that is causing interference during the first interference measurement. The said request may be comprised in the control message transmitted in block 420. The at least one terminal device 110 may receive the said request. The at least one terminal device 110 may determine the radio technology used by the at least one interference source during the at least one transmission gap, and transmit an indication, as a part of the interference report, to the network element 102, wherein the indication indicates the radio technology used by the at least one interference source. The determination and reporting of the radio technology may be done by the at least one terminal device 110 in a response to the first and second requests of the control message. Thus, it may not require a specific request from the network element 102, and thus the triggering of the determination of the radio technology may be done by the network element 102 and/or the at least one terminal device 110.

In an embodiment, the interference report further comprises an identity of the at least one interference source. The at least one terminal device 110 may identify the identity of the at least one interference source. This may be done by LTE-U neighbor identification utilizing cell search using PSS and/or SSS signals, for example. Similarly, the cell search may be used to determine the radio technology used of the at least one interference source. In an embodiment, the indication indicates one of the following: the at least one interference source utilizes the same radio technology as the network element, or the at least one interference source utilizes a different radio technology than the network element 102.

In an embodiment, the identifying of the at least one terminal device is done by decoding PLMN ID and/or a Global CID.

It needs to be noted that the first interference measurement may comprise normal background noise and/or interference which may not be over a third interference threshold value. However, the at least one terminal device 110 may transmit the results to the network element 102 even though the interference would be under the third threshold. In an embodiment, the at least one terminal device 110 determines that the result of the first interference measurement is under the third interference threshold value, and as a response to the said determining, cancels the transmission of the interference report. Thus, the report is only sent if the interference is over the third threshold.

In an embodiment, the control message, transmitted by the network element 102 in block 420, further comprises the third interference threshold value. The at least one terminal device 110 may receive the third interference threshold value and use it as described above.

In an embodiment, the at least one terminal device 110 determines, based on the first and the second interference measurements, that the measured interference, by the at least one terminal device, is under the second interference threshold value, and as a response to the said determining, canceling the transmission of the interference report.

Figure 5:
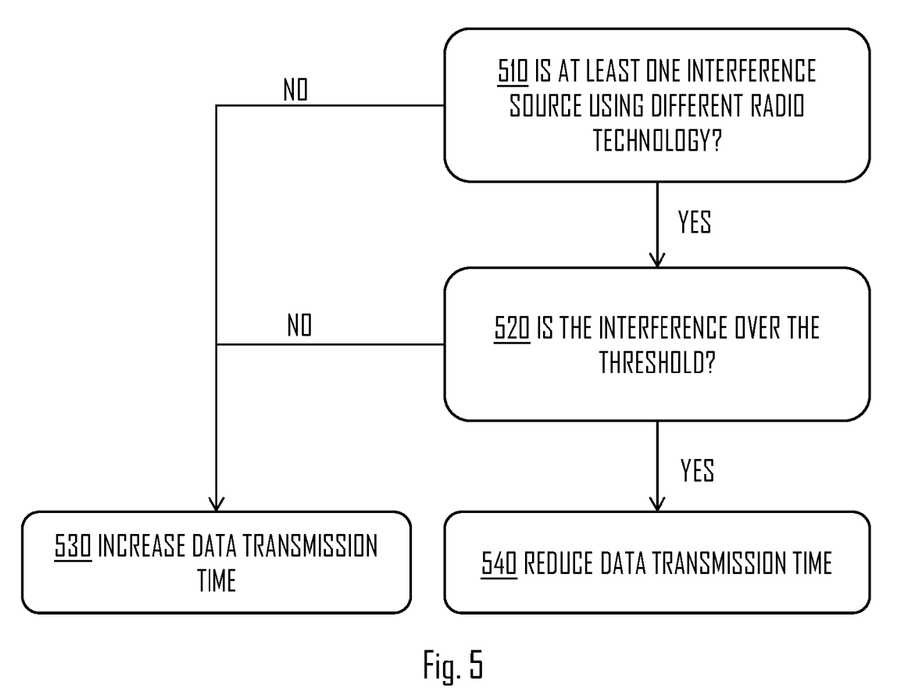
FIG. 5 illustrates a flow diagram according to an embodiment of the invention.

Still referring to FIG. 4, in block 450 the network element 102 may provide communication resources as in step 240 of FIG. 2. Let us look closer on the block 450 in relation to FIG. 5 illustrating a flow diagram according to an embodiment of the invention. FIG. 5 may illustrate the determination of the network element 102 in step 450 and/or after it. Referring to FIG. 5, in step 510, the network element 102 may determine is the at least one interference source using different radio technology than the network element 102 itself. The determination may be based on the interference report comprising information and/or indication of the at least one interference source. If the network element 102 determines that the interference source is using a different radio technology, such as WLAN for example, the network element 102 may proceed to step 520. In step 520, the network element 102 may determine is the interference, based on the interference report, over a predetermined threshold. If the interference is over the predetermined threshold, the network element 102 may proceed to step 540 and reduce the data transmission time of the network element 102, and thus provide, for example, for a WLAN access node more better transmission environment.

In an embodiment, the network element determines that the interference measurement results, such as RSSI measurement results, are over the threshold and no other interfering LTE-U transmission is identified by the at least one terminal device 110. The network element 102 may after that continue normal operation, and thus not necessarily increase the data transmission time of the network element 102.

Still referring to FIG. 5, if the determination in steps 510 and/or 520 is negative or in other words 'NO', the network element 102 may proceed to step 530 and increase the data transmission time. However, it may not necessarily mean that the data transmission time is increased. Rather it may be an option for the network element 102 if it determines that more data transmission time is needed.

In an embodiment, the network element 102 determines, based on the interference report, that the interference measured by the at least one terminal device 110 is under the second interference threshold, and increases, at least partly on the basis of the said determining, the data transmission time the network element 102.

In an embodiment, the network element 102 determines, based on the interference report, that the interference measured by the at least one terminal device 110 is over the first interference threshold, and reduces, at least partly on the basis of the said determining, the data transmission time of the network element 102.

In an embodiment, the network element 102 determines, based on the interference report, that the at least one interference source utilizes a different radio technology as the network element 102, and that the interference measured by the at least one terminal device 110 is over the first interference threshold, and as a response to the said determining, reduces the data transmission time of the network element 102.

In an embodiment, the network element 102 determines, based on the interference report, that the at least one interference source utilizes the same radio technology as the network element 102, and that the interference measured by the at least one terminal device 110 is over the first interference threshold, and as a response to the said determining, provides communication resources by increasing the data transmission time of the network element 102.

Figure 6A:
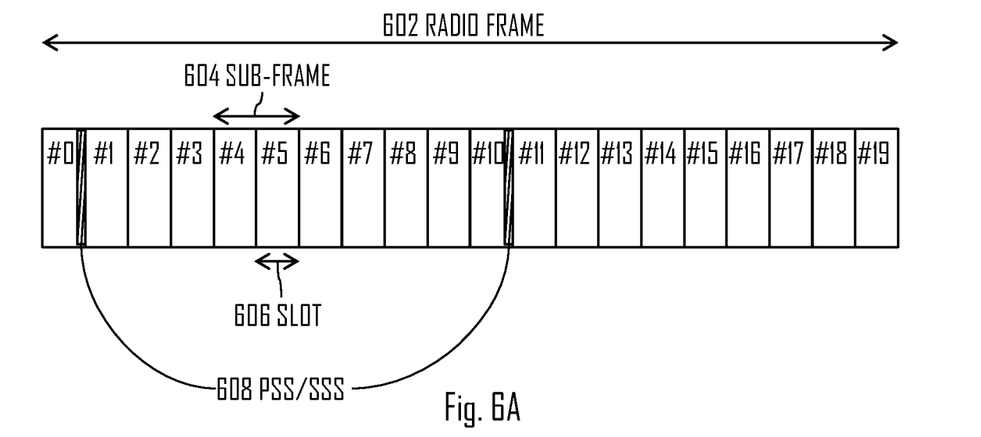
FIGS. 6A, 6B, 6C and 6D illustrate embodiments of the invention.

FIG. 6A illustrates an embodiment of the invention. Referring to FIG. 6A, radio frame 602 may comprise ten sub-frames 604, wherein each sub-frame 604 may comprise two slots 606. The radio frame 602 may be a LTE-U frame, for example. The radio frame's 602 duration may be, for example, 10 milliseconds (ms), and thus the sub-frame 604 may last 1 ms and the slot 606 0.5 ms. The sub-frames 604 may be used for uplink and/or downlink data transmission by the network element 102. As described, the network element 102 may generate transmission gap(s) to the data transmission, which may mean that some of the sub-frames and/or slots are not used for transmission and/or receiving. The transmission gap(s) may be semi-static and/or fixed. This may mean that they may be recurring in adjacent radio frames. The network element 102 may, for example, configure that the recurrence of the transmission gap(s) is two gaps in one radio frame, and that the gaps are generated in every other adjacent radio frame. The radio frame 602 may further comprise timeframes for PSS/SSS signals 608 which may be used for cell search as described above.

Figure 6B:
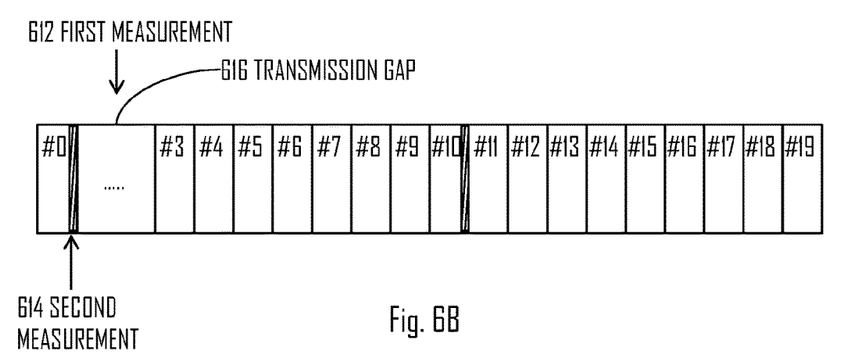

Let us now look closer on the first and second measurement during the radio frame 602 in relation to the embodiment shown in FIG. 6B. Referring to FIG. 6B, the network element 102 may generate transmission gap 616 to the slots numbered 1 to 2. Thus, the transmission gap 616 may last for one sub-frame of the radio frame 602. The network element 102 may configure the control message so that the first interference measurement 612 is requested to be performed during the transmission gap 616. The network element 102 may request the first interference measurement 612 to be performed at an exact time and/or it may let the at least one terminal device 110 to decide in which exact time within a given timeframe (slots 1 to 2) the measurement 612 should be performed.

The purpose of the second measurement 614 may be to provide a reference for the first interference measurement 612 from a time where there are known data transmission(s). Thus, the network element 102 may request the second interference measurement 614 to be performed when it knows that there are active data transmission(s). The second measurement 614 may be performed after the first measurement 612 and vice versa, as the results may be reported, by the at least one terminal device 110, in another radio frame, for example. In an embodiment, the network element 102 requests the at least one terminal device 110 to perform the second interference measurement 614 during the timeframe reserved for the PSS/SSS signals.

Figure 6C:
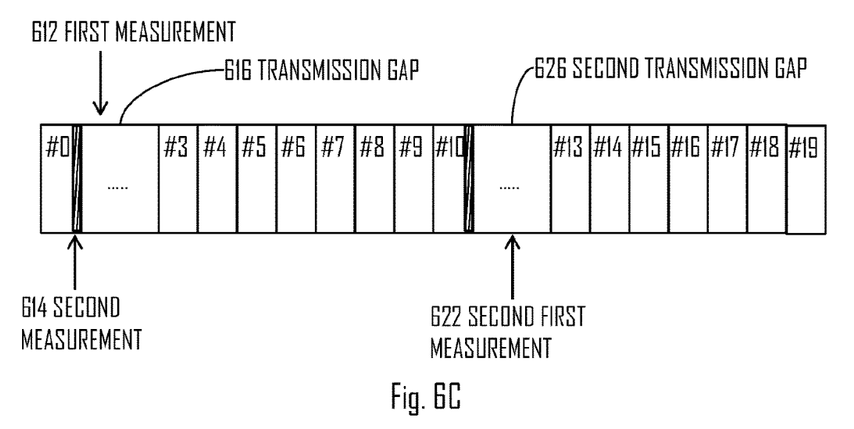

FIG. 6C illustrates an embodiment of the invention. Referring to FIG. 6C, the network element 102 may generate a transmission gap sequence comprising the at least one transmission gap 616, 626, and wherein the first request requests the at least one terminal device to perform the first interference measurement 612, 622 during each transmission gap 616, 626 of the transmission gap sequence. Thus, the second first interference measurement 622 may be performed during the second transmission gap 626 of the transmission gap sequence.

Similarly the first request, by the network element 102 may request the at least one terminal device 110 to perform the first interference measurement 612, 622 during each transmission gap of a transmission gap sequence comprising the at least one transmission gap 616, 626, and wherein the at least one terminal device 110 may perform the first interference measurement 612, 622 during each gap of the transmission gap sequence. The at least one terminal device 110 may further transmit the interference report after each performed first interference measurement 612, 622, and wherein at least one of the transmitted interference reports may comprise the second interference measurement 614. In an embodiment, the interference report comprises more than one first interference measurements 612, 622.

It need to be noted that although in FIG. 6C the gaps 616, 626 and the measurements 612, 614, 622 are located within one radio frame 602, the gaps 616, 626 and the measurements 612, 614, 622 may be located within different radio frames. Thus, for example, the second transmission gap 626 may located in an adjacent radio frame, and thus the second first interference measurement 622 may be performed in the adjacent radio frame during the second transmission gap.

In an embodiment, the at least one transmission gap is generated by the network element 102 within an uplink data transmission by the at least one terminal device 110. The at least one terminal device 110 may be requested by the network element 102 to perform the interference measurements during the at least one transmission gap. The at least one terminal device 110 may receive the request and perform the first interference measurement during the at least one transmission gap that is generated within the uplink data transmission. In an embodiment, the at least one terminal device 110 comprises all the terminal devices within the cell 104 provided by the network element 102.

Figure 6D:
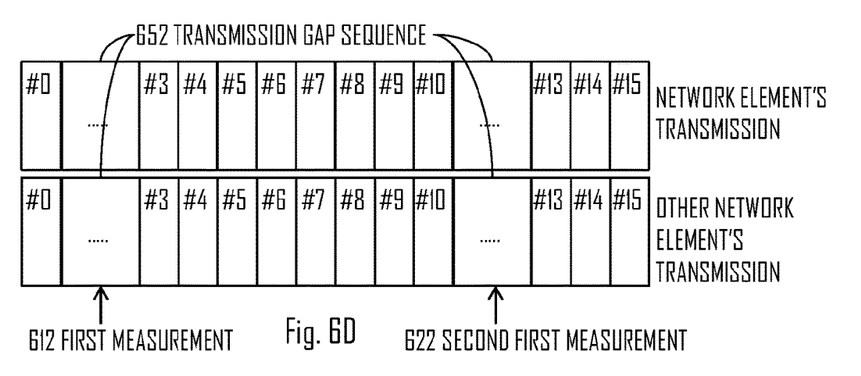

FIG. 6D illustrates an embodiment of the invention. Referring to FIG. 6D, the network element's 102 data transmission is illustrated with the upper partial radio frame, and at least one other network element's data transmission is illustrated with the lower partial radio frame. Even though the illustrated radio frames are partial, it may be equally possible to use complete radio frames and/or multiple radio frames, The network element 102 may request, from the at least one other network element transmitting on the same channel, to generate the at least one transmission gap or transmission gap sequence 652 within the at least one other network element's data transmission so that the at least one transmission gap or transmission gap sequence 652 are aligned between the network element 102 and the at least one other network element, and wherein the network element 102 request the at least one terminal device 110 to perform the first interference measurement 612, 622 during the aligned at least one transmission gap or transmission gap sequence 652.

As shown in FIG. 6D, transmission gaps or transmission gap sequence 652 may be aligned between the data transmission of the network element 102 and the other network element. This alignment may possible as LTE-U nodes at least of the same network operators may be time aligned, meaning that radio frames may be synchronized at least in close proximity of each other. In an embodiment, the network element 102 aligns the at least one transmission gap, by using X2-interface for example, between network elements within the same network. The at least one transmission gap may be aligned, by the network element 102, with other networks as well. Thus, the interference measurements may be more effective, as the interference from, for example, other LTE-U base stations may be controlled regardless of their operators. By doing this, the network element 102 may generate, for the at least one terminal device 110, transmission gap(s), wherein LTE-U transmissions are limited, and thus the at least one terminal device 110 may better measure the interference caused by WLAN access nodes and/or terminals.

In an embodiment, the network element 102 time aligns at least one transmission gap or sequence with at least one another network element transmitting on the same channel, wherein at least one network element requests the at least one terminal device 110 to perform the first interference measurement during one time aligned transmission gap.

Figure 7:
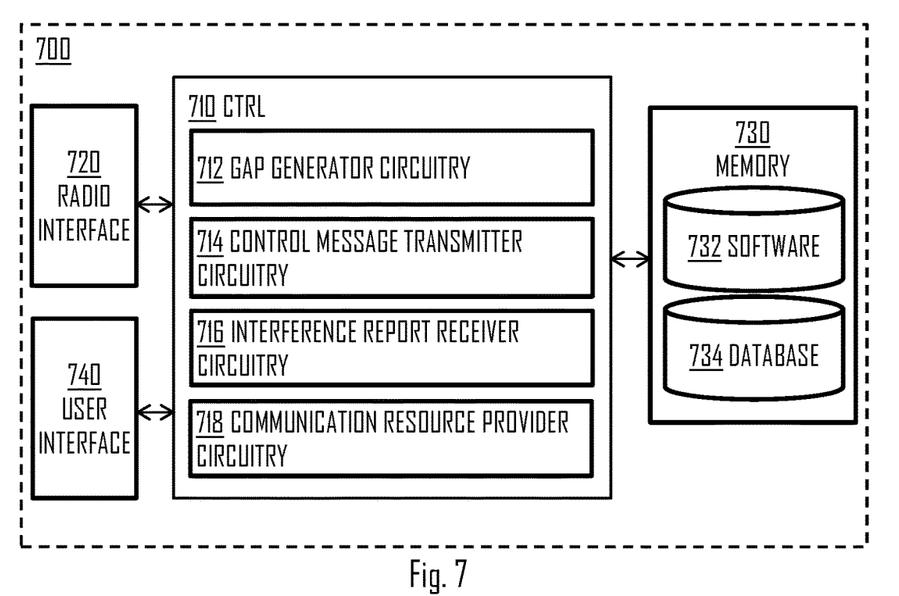
FIGS. 7 and 8 illustrate apparatuses according to some embodiments of the invention.
Figure 8:
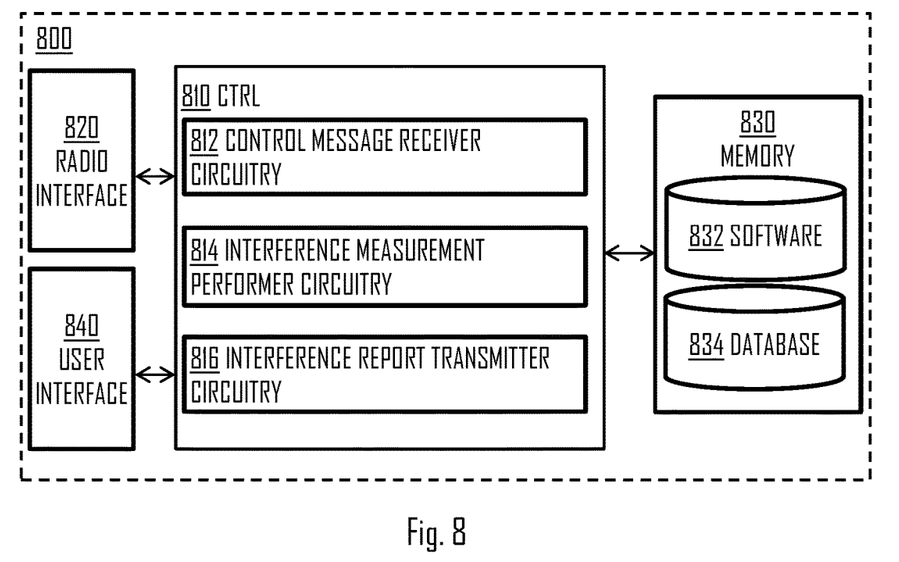

FIGS. 7 to 8 provide apparatuses 700, 800 comprising a control circuitry (CTRL) 710, 810, such as at least one processor, and at least one memory 730, 830 including a computer program code (software) 732, 832, wherein the at least one memory and the computer program code (software) 732, 832, are configured, with the at least one processor, to cause the respective apparatus 700, 800 to carry out any one of the embodiments of FIGS. 1 to 6D, or operations thereof.

In an embodiment, these operations may comprise tasks, such as, generating, by a network element 102, at least one transmission gap within data transmission performed by the network element 102, transmitting a control message to at least one terminal device 110, wherein the control message comprises a first request to perform, by the at least one terminal device 110, a first interference measurement during the at least one transmission gap, and wherein the control message further comprises a second request to perform, by the at least one terminal device 110, a second interference measurement during the said data transmission, receiving, from the at least one terminal device 110, an interference report comprising information that is at least partly based on the first and the second interference measurements performed by the at least one terminal device 110, and providing communication resources on the basis of the received interference report.

In an embodiment, these operations may comprise tasks, such as receiving, by a terminal device, a control message from a network element 102, wherein the control message comprises a first request to perform a first interference measurement during at least one transmission gap of data transmission performed by the network element 102, and wherein the control message further comprises a second request to perform a second interference measurement during the said data transmission, performing the first and the second interference measurements, wherein the first interference measurement is performed during the at least one transmission gap, and wherein the second interference measurement is performed during the data transmission, and transmitting an interference report to the network element 102, wherein the interference report comprises information that is at least partly based on the first and the second interference measurements performed by the terminal device.

Referring to FIG. 7, the memory 730 may be implemented using any suitable data storage technology, such as semiconductor based memory devices, flash memory, magnetic memory devices and systems, optical memory devices and systems, fixed memory and removable memory. The memory 730 may comprise a database 734 for storing data.

The apparatus 700 may further comprise radio interface (TRX) 720 comprising hardware and/or software for realizing communication connectivity according to one or more communication protocols. The TRX may provide the apparatus with communication capabilities to access the radio access network and enable communication between network nodes, for example. The TRX may provide the apparatus 700 connection to the above-mentioned X2 interface. The TRX may comprise standard well-known components such as an amplifier, filter, frequency-converter, (de)modulator, and encoder/decoder circuitries and one or more antennas.

The apparatus 700 may also comprise user interface 740 comprising, for example, at least one keypad, a microphone, a touch display, a display, a speaker, etc. The user interface 740 may be used to control the respective apparatus by a user of the apparatus 700.

In an embodiment, the apparatus 700 may be or be comprised in a base station (also called a base transceiver station, a Node B, a radio network controller, or an evolved Node B, for example). In an embodiment, the apparatus 700 is or is comprised in the network element 102.

The control circuitry 710 may comprise a gap generator circuitry 712 configured to generate at least one transmission gap within data transmission performed by the network element. The control circuitry 712 may comprise a control message transmitter 714 configured to transmit a control message to at least one terminal device 110, wherein the control message comprises a first request to perform, by the at least one terminal device 110, a first interference measurement during the at least one transmission gap, and wherein the control message further comprises a second request to perform, by the at least one terminal device 110, a second interference measurement during the said data transmission. The control circuitry 710 may further comprise an interference report receiver circuitry 716 configured to receive, from the at least one terminal device 110, an interference report comprising information that is at least partly based on the first and the second interference measurements performed by the at least one terminal device 110. Further, the control circuitry 710 may comprise a communication receiver circuitry 718 configured to provide communication resources on the basis of the received interference report.

Referring to FIG. 8, the memory 830 may be implemented using any suitable data storage technology, such as semiconductor based memory devices, flash memory, magnetic memory devices and systems, optical memory devices and systems, fixed memory and removable memory. The memory 830 may comprise a database 834 for storing data, such as the first and second interference measurement results.

The apparatus 800 may further comprise radio interface (TRX) 820 comprising hardware and/or software for realizing communication connectivity according to one or more communication protocols. The TRX may provide the apparatus with communication capabilities to access the radio access network and enable communication between network nodes, for example. The TRX may comprise standard well-known components such as an amplifier, filter, frequency-converter, (de)modulator, and encoder/decoder circuitries and one or more antennas.

The apparatus 800 may also comprise user interface 840 comprising, for example, at least one keypad, a microphone, a touch display, a display, a speaker, etc. The user interface 840 may be used to control the respective apparatus by a user of the apparatus 800.

In an embodiment, the apparatus 800 is and/or comprises the at least one terminal device 110. In an embodiment, the apparatus 800 is and/or comprises the terminal device performing the steps of FIG. 3.

The control circuitry 810 may comprise a control message receiver circuitry 812 configured to receive a control message from a network element 102, wherein the control message comprises a first request to perform a first interference measurement during at least one transmission gap of data transmission performed by the network element 102, and wherein the control message further comprises a second request to perform a second interference measurement during the said data transmission. The control circuitry 810 may further comprise an interference measurement performer circuitry 814 configured to perform the first and the second interference measurements, wherein the first interference measurement is performed during the at least one transmission gap, and wherein the second interference measurement is performed during the data transmission. Further, the control circuitry 810 may comprise an interference report transmitter circuitry 816 configured to transmit an interference report to the network element 102, wherein the interference report comprises information that is at least partly based on the first and the second interference measurements performed by the interference measurement performer circuitry 814.

Figure 9:
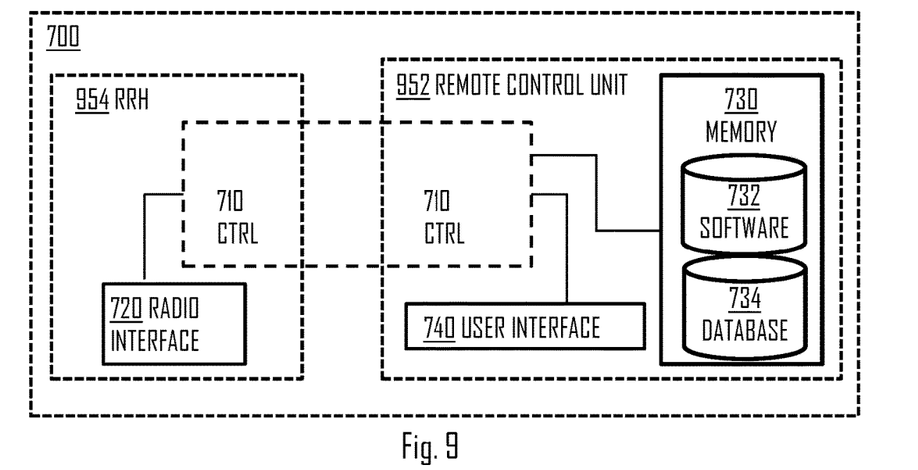
FIG. 9 illustrates an embodiment of the invention.

In an embodiment, as shown in FIG. 9, at least some of the functionalities of the apparatus 700 may be shared between two physically separate devices, forming one operational entity. Therefore, the apparatus 700 may be seen to depict the operational entity comprising one or more physically separate devices for executing at least some of the described processes. Thus, the apparatus 700 of FIG. 9, utilizing such shared architecture, may comprise a remote control unit (RCU) 952, such as a host computer or a server computer, operatively coupled (e.g. via a wireless or wired network) to a remote radio head (RRH) 954 located in the base station. In an embodiment, at least some of the described processes may be performed by the RCU 952. In an embodiment, the execution of at least some of the described processes may be shared among the RRH 954 and the RCU 952.

In an embodiment, the RCU 952 may generate a virtual network through which the RCU 952 communicates with the RRH 954. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the at least one terminal device 110.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 6D may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 6D or operations thereof. In an embodiment, these operations may comprise tasks, such as, generating, by a network element 102, at least one transmission gap within data transmission performed by the network element 102, transmitting a control message to at least one terminal device 110, wherein the control message comprises a first request to perform, by the at least one terminal device 110, a first interference measurement during the at least one transmission gap, and wherein the control message further comprises a second request to perform, by the at least one terminal device 110, a second interference measurement during the said data transmission, receiving, from the at least one terminal device 110, an interference report comprising information that is at least partly based on the first and the second interference measurements performed by the at least one terminal device 110, and providing communication resources on the basis of the received interference report. In an embodiment, these operations may comprise tasks, such as receiving, by a terminal device, a control message from a network element 102, wherein the control message comprises a first request to perform a first interference measurement during at least one transmission gap of data transmission performed by the network element 102, and wherein the control message further comprises a second request to perform a second interference measurement during the said data transmission, performing the first and the second interference measurements, wherein the first interference measurement is performed during the at least one transmission gap, and wherein the second interference measurement is performed during the data transmission, and transmitting an interference report to the network element 102, wherein the interference report comprises information that is at least partly based on the first and the second interference measurements performed by the terminal device.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 6D, or operations thereof. In an embodiment, these operations may comprise tasks, such as, generating, by a network element 102, at least one transmission gap within data transmission performed by the network element 102, transmitting a control message to at least one terminal device 110, wherein the control message comprises a first request to perform, by the at least one terminal device 110, a first interference measurement during the at least one transmission gap, and wherein the control message further comprises a second request to perform, by the at least one terminal device 110, a second interference measurement during the said data transmission, receiving, from the at least one terminal device 110, an interference report comprising information that is at least partly based on the first and the second interference measurements performed by the at least one terminal device 110, and providing communication resources on the basis of the received interference report. In an embodiment, these operations may comprise tasks, such as receiving, by a terminal device, a control message from a network element 102, wherein the control message comprises a first request to perform a first interference measurement during at least one transmission gap of data transmission performed by the network element 102, and wherein the control message further comprises a second request to perform a second interference measurement during the said data transmission, performing the first and the second interference measurements, wherein the first interference measurement is performed during the at least one transmission gap, and wherein the second interference measurement is performed during the data transmission, and transmitting an interference report to the network element 102, wherein the interference report comprises information that is at least partly based on the first and the second interference measurements performed by the terminal device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 6D may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   generating, by a network element, at least one transmission gap within data transmission performed by the network element, wherein the at least one transmission gap is generated as a part of a listen-before-talk procedure for communication on an unlicensed band;
   transmitting a control message to at least one terminal device, wherein the control message comprises a first request to perform, by the at least one terminal device, a first interference measurement during the at least one transmission gap, wherein the control message further comprises a second request to perform, by the at least one terminal device, a second interference measurement during the said data transmission;
   receiving, from the at least one terminal device, an interference report associated with the listen-before-talk procedure comprising information that is at least partly based on the first and the second interference measurements; and
   based on the received interference report indicating that the unlicensed band is not occupied, providing communication resources for the communication.

2. The method of claim 1, wherein the information in the interference report comprises at least one of:
   result of the first interference measurement,
   result of the second interference measurement, and
   an interference indicator indicating whether the measured interference, by the at least one terminal device, is over a first interference threshold or under a second interference threshold.

3. The method of claim 1, wherein the interference report further comprises an indication indicating the radio technology used by at least one interference source that is causing interference to the at least one terminal device during the at least one transmission gap wherein the interference report further comprises an identity of the at least one interference source.

4. The method of claim 1, further comprising:
   determining, based on the interference report, that the interference measured by the at least one terminal device is under the second interference threshold; and
   increasing, at least partly on the basis of the said determining, the data transmission time the network element.

5. The method of claim 1, further comprising:
   determining, based on the interference report, that the interference measured by the at least one terminal device is over the first interference threshold; and
   reducing, at least partly on the basis of the said determining, the data transmission time of the network element.

6. The method of claim 3, further comprising:
   determining, based on the interference report, that the at least one interference source utilizes a different radio technology than the network element, and that the interference measured by the at least one terminal device is over the first interference threshold; and
   as a response to the said determining, reducing the data transmission time of the network element.

7. The method of claim 3, further comprising:
   determining, based on the interference report, that the at least one interference source utilizes a same radio technology as the network element, and that the interference measured by the at least one terminal device is over the first interference threshold; and
   as a response to the said determining, providing communication resources by increasing the data transmission time of the network element.

8. The method of claim 1, wherein the control message further comprises at least one of: the first interference threshold value and the second interference threshold value.

9. The method of claim 1, wherein the network element generates a transmission gap sequence comprising the at least one transmission gap, and wherein the first request requests the at least one terminal device to perform the first interference measurement during each transmission gap of the transmission gap sequence.

10. The method of claim 1, wherein the network element requests, from at least one other network element transmitting on a same channel, to generate the at least one transmission gap or transmission gap sequence within the at least one other network element's data transmission so that the at least one transmission gap or transmission gap sequence are aligned between the network element and the at least one other network element, and wherein the network element request the at least one terminal device to perform the first interference measurement during the aligned at least one transmission gap or transmission gap sequence.

11. An apparatus comprising:
    at least one processor and at least one memory including a computer pro-gram code, wherein the at least one memory and the computer program code are configured, with the at least one processor, to cause a network element to perform operations comprising the method according to claim 1.

12. A computer program product embodied on a non-transitory distribution medium readable by a computer and comprising program instructions which, when loaded into an apparatus, execute the method according to claim 1.

13. A method comprising:
    receiving, by a terminal device, a control message from a network element, wherein the control message comprises a first request to perform a first interference measurement during at least one transmission gap of data transmission per-formed by the network element, and wherein the control message further comprises a second request to perform a second interference measurement during the said data transmission, wherein the at least one transmission gap is part of a listen-before-talk procedure for communication on an unlicensed band;
    performing the first and the second interference measurements, wherein the first interference measurement is performed during the at least one transmission gap, and wherein the second interference measurement is performed during the data transmission;
    transmitting an interference report associated with the listen-before-talk procedure to the network element, wherein the interference report comprises information that is at least partly based on the first and the second interference measurements; and
    based on the transmitted interference report indicating that the unlicensed band is not occupied, receiving communication resources for the communication.

14. The method of claim 13, wherein the information in the interference report comprises at least one of:

result of the first interference measurement,
result of the second interference measurement, and
an interference indicator indicating whether the measured interference, by the terminal device, is above a first interference threshold or below a second interference threshold; and further comprising:
determining, based on the first and the second interference measurements, that the measured interference is under the second interference threshold value; and
as a response to the said determining, canceling the transmission of the interference report.

15. The method of claim 13, further comprising: receiving, from the network element, at least one of: the first interference threshold value and the second interference threshold value.

16. The method of claim 13, further comprising: determining radio technology used by at least one interference source that is causing interference to the terminal device during the at least one transmission gap; and
transmitting an indication, as a part of the interference report, to the network element, wherein the indication indicates the radio technology used by the at least one interference source, identifying the at least one interference source, wherein the interference report comprises the identity of the at least one interference source.

17. The method of claim 13, wherein the first request re-quests the terminal device to perform the first interference measurement during each transmission gap of a transmission gap sequence comprising the at least one transmission gap, and wherein the terminal device performs the first interference measurement during each gap of the transmission gap sequence wherein the terminal device transmits the interference report after each performed first interference measurement, and wherein at least one of the transmitted interference reports comprises the second interference measurement, and wherein the interference report comprises more than one first interference measurements.

18. An apparatus comprising:
at least one processor and at least one memory including a computer program code, wherein the at least one memory and the computer program code are configured, with the at least one processor, to cause a terminal device to perform operations comprising: the method of claim 13.

19. A computer program product embodied on a non-transitory distribution medium readable by a computer and comprising program instructions which, when loaded into an apparatus, execute the method according to claim 13.

* * * * *